E. E. LINDSEY.
BAKING OVEN.
APPLICATION FILED APR. 16, 1919.

1,391,258.

Patented Sept. 20, 1921.
3 SHEETS—SHEET 3.

Inventor
Ernest E. Lindsey
By Arthur L. Slee
Atty.

UNITED STATES PATENT OFFICE.

ERNEST E. LINDSEY, OF SAN FRANCISCO, CALIFORNIA, ASSIGNOR TO BAKE-RITE OVEN MANUFACTURING COMPANY, A CORPORATION OF NEVADA.

BAKING-OVEN.

1,391,258.  Specification of Letters Patent.  Patented Sept. 20, 1921.

Application filed April 16, 1919. Serial No. 290,500.

*To all whom it may concern:*

Be it known that I, ERNEST E. LINDSEY, a citizen of the United States, residing in the city and county of San Francisco and State of California, have invented a certain new and useful Improvement in Baking-Ovens, of which the following is a specification.

My invention relates to improvements in ovens, and it has particular reference to an oven adapted for use of bakers and provided with a baking chamber in which the product to be baked is moved during the baking process, and the objects of my invention are:

First, to produce a homogeneous wall structure of an exceedingly strong construction and adapted to maintain a maximum of the heat within the baking chamber;

Second, to provide a heat-radiating means and heating means therefor within the baking chamber so as to produce a maximum of heat from a minimum quantity of fuel;

Third, to heat the product in the baking chamber uniformly;

Fourth, to provide means for carrying the exhaust from the heating means away from the baking chamber before the exhaust can reach the product;

Fifth, to provide means for moistening the product during the baking process; and Sixth, to provide an oven which, although being of maximum capacity, may be easily moved from one place to another.

I accomplish these and other objects, which may appear hereinafter by the construction disclosed in the accompanying drawings, which form a part of the present specification and wherein like characters of reference are used to designate similar parts throughout the specification and drawings, and in which.

Figure 1:
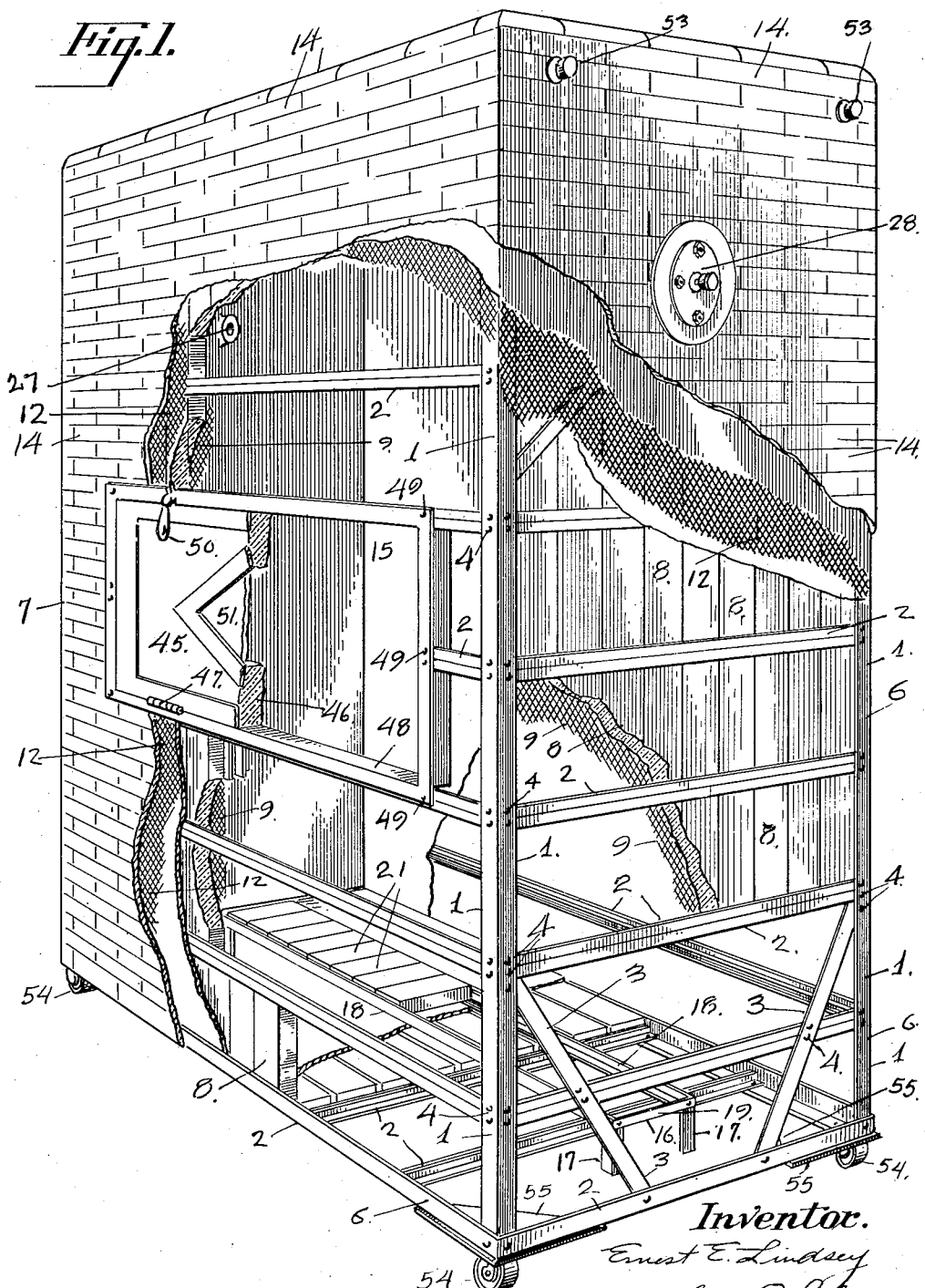
Figure 1 is a perspective view of my improved oven, parts being broken away and in section and other parts being removed in order to show the frame construction and the arrangement of certain interior parts.
Figure 2:
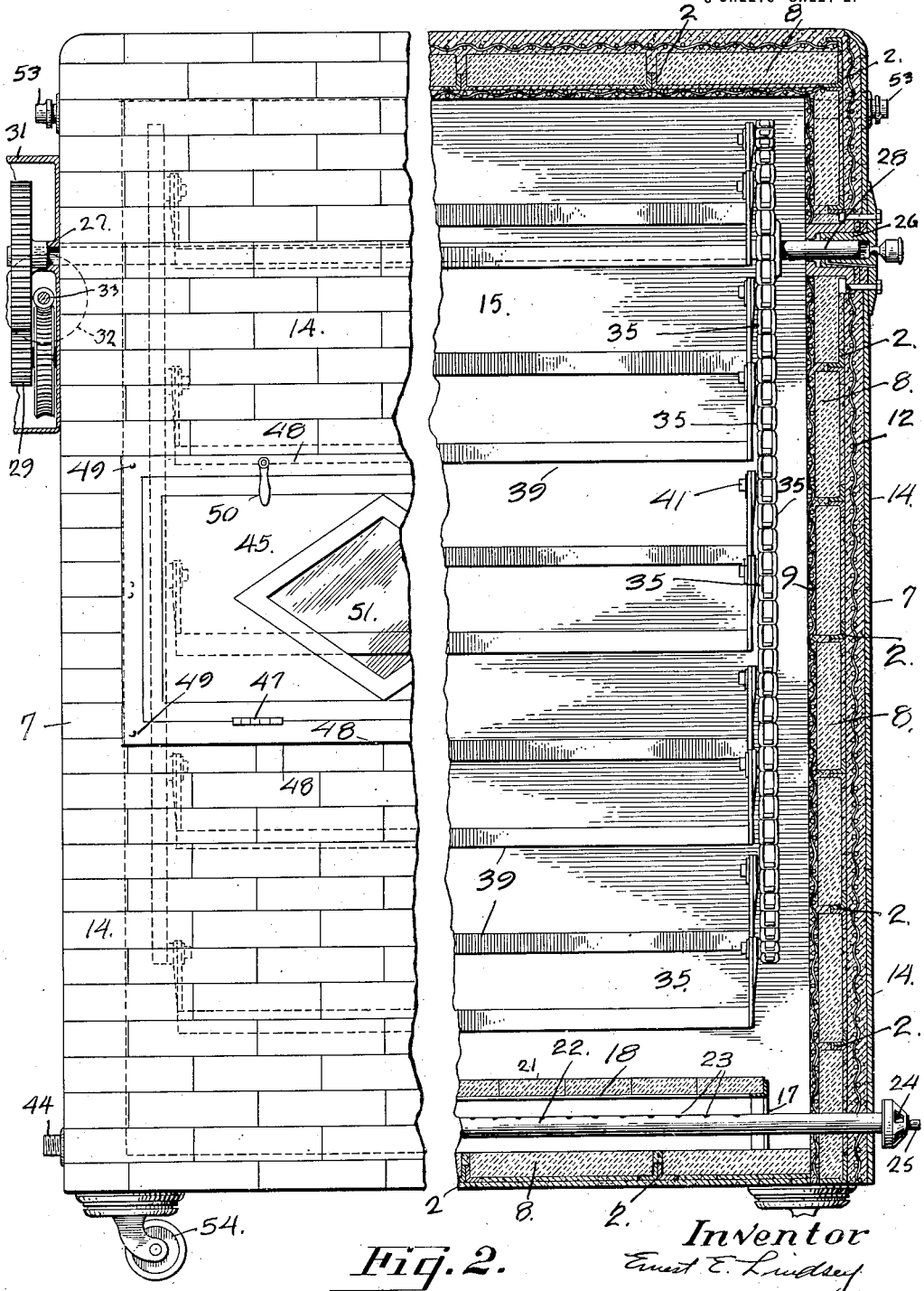
Fig. 2 is a broken and partly sectional front elevation of the oven, the lower shaft, its sprocket wheels, and the guide blocks in the wall being removed.
Figure 3:
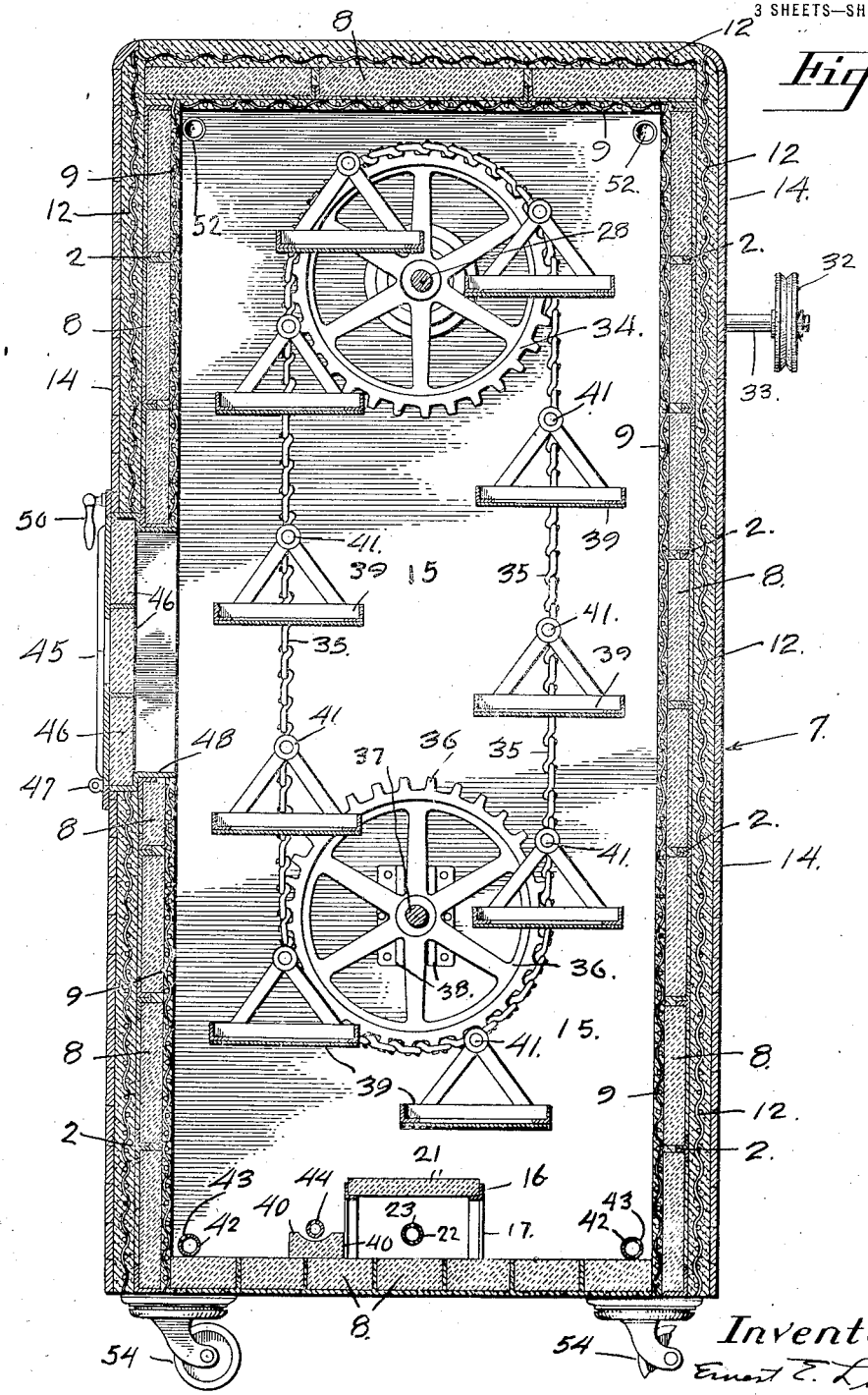
Fig. 3 is a sectional side elevation of the oven.

Standards comprising vertical angle bars 1, horizontal lengthwise and transverse angle bars 2 and oblique braces 3, all of which are made of iron or any other strong, suitable metal or material, are riveted or otherwise secured together, as shown at 4, and thus form a strong and rigid frame 6 for the oven 7, the horizontal tie bars 2 being spaced apart to admit between them bricks 8 of fire-insulating material, such as fire clay, in the top, the bottom and the sides of the frame 6. In the top and in the sides of the frame 6 are placed for reinforcing purposes a metallic reticulum 9 on the inner side of the bricks 8. Another metallic reticulum 12 is placed on the outer sides of the bricks to further reinforce the structure. An outer surface of tile 14 is applied to the sides of the side walls, to increase the insulating power of the wall and to give a neat appearance, said tile 14 being bound to the wall by mortar or other suitable material applied in such manner as to cause the reticulum 12 to be embedded therein.

The baking chamber 15 thus formed in the oven 7 has mounted upon the bottom thereof a frame 16, comprising standards in the form of angle bars 17 to the tops of which are riveted horizontal, lengthwise angle bars 18 and horizontal, transverse angle bars 19 the standards 17 and the bars 18 and 19 being preferably of iron or some other strong and durable material comparatively unaffected by heat, and the bars 18, which run longitudinally within the baking chamber 15, are spaced apart for holding between them heat-radiating means, such as fire bricks 21, so that the bricks thus cover the whole length of the angle bars 18. Longitudinally within the baking chamber 15 and extending through one of the end walls of the oven 7 is a gas burner in the form of a pipe 22, provided with the usual perforations 23 in the top thereof and with air inlets 24 outside of the oven and being in any suitable manner attached to a source of gas supply, not shown, at its outer connection 25.

Longitudinally and rotatably mounted within and near the top of the chamber 15 in suitable bearings 26, 27, is a shaft 28, extending outwardly at one end of the oven 7 and being by gearing 29, suitably inclosed, as shown at 31, connected with a suitable power source, not shown, through a pulley 32 secured upon a shaft 33. Upon the shaft 28 are secured, near the end walls of the chamber 15, respective sprocket wheels 34, each of which engage the upper loop of an endless sprocket chain 35, while the lower loops of the sprocket chains are engaged by respective sprocket wheels 36, and the latter sprocket wheels are secured upon a shaft 37, which is with its ends slidably mounted in guide blocks 38, secured on the end walls of the chamber 15. Trays 39, suitably constructed for holding a product to be baked thereon and extending from one sprocket chain 35 to the other, are pivotally secured to the chains, as shown at 41, and, while thus carried by the chains, are always adapted to retain a substantially horizontal position, and in the lowermost position during their travel, to be directly above the heat-radiating means 21.

Within the chamber 15, on each side of the heat-radiating means 21 and preferably at the bottom of the chamber, is a suction pipe 42, provided with perforations 43 in its wall and connected with a pump, not shown, and through one end wall of the oven 7 extends a pipe 44, which is threaded for connection with a suitable water source, not shown, and is provided with openings in its wall so that the water from the pipe 44 may drop upon the bricks 40 which are secured at the bottom of the chamber and directly below the pipe for the purpose of converting the water to steam when the bricks are heated.

In order to provide access to the baking chamber 15, the oven 7 is in front thereof provided with a door 45, which on its inner side is lined with bricks 46 of heat-insulating material. The door 45 is pivotally secured by hinges 47 to its frame 48, which is embedded in the wall and is riveted to the frame 6, as shown at 49, and a suitable latch and handle means 50 is also provided for opening the door and for holding it tightly closed when the oven is in operation. For the purpose of facilitating inspection of the product in the chamber 15 during the baking process, the door 45 has also therein a transparent plate 51 of annealed glass or other heat-resisting material.

Within the chamber 15, at the top and at the corners thereof, are pipes 52, the purpose of which will be explained hereinafter, and the pipes 52 are normally closed by caps 53 secured thereon at their outer ends.

In order to facilitate the moving and the installation of the oven 7, the oven is at the lower corners of the frame 6 provided with casters 54, secured to respective gussets 55, which also serve as braces for strengthening the frame.

When it is desired to use the oven 7, the product to be baked is placed on the trays 39; the motive power for the shaft 28, and the pump for the suction pipes 42, are set in operation; the gas burner 22 is lighted, and water through the pipe 44 is supplied from its source, the door 45, of course, being closed during the baking process. The heat-radiating means 21, heated by the burner 22, will soon heat the whole chamber 15, and, as the product is in constant motion toward or away from the heating means, a uniformly baked product is thus assured. During the baking process the steam produced by the water poured on the hot bricks 40 arises in the chamber 15 and moistens the product and thereby materially aids the operator in tempering the product. Before the exhaust from the burner 22 can reach the product, the exhaust is carried away through the suction pipes 42, which also relieve the internal pressure in the chamber. If for some reason, however, the internal pressure, in spite of the suction from the pipes 42, should become excessive, the operator may remove one or more of the caps 53 from the pipes 52 and thereby instantly relieve the pressure, the pipes thus serving as auxiliary means to the suction pipes 42 for relieving such pressure.

My invention being thus fully and clearly described, what I claim as new and desire to secure by Letters Patent, is:

1. In an oven adapted for baking purposes, the combination with a metallic frame for the top, the bottom and the sides of the oven, of horizontal girders spaced for supporting heat-insulating material; metallic reticula secured against the outer and inner surfaces of said heat insulating material in the top and sides; and tile outside of the outer reticulum in the sides; said frame, girders, insulating material, reticula and tile being mortared together to form a homogeneous wall structure.

2. In an oven adapted for baking purposes, the combination with a metallic frame for the top, bottom and sides of the oven, of horizontal lengthwise and transverse girders spaced for supporting heat insulating materials; metallic reticula secured against the outer and inner surfaces of said insulating material in the top and sides; and tile outside of the outer reticulum in the sides; said frame, girders, insulating material, reticula and tile being mortared together to form a homogeneous wall structure.

3. In an oven adapted for baking purposes, the combination with a metallic frame for the top, bottom, and sides of the oven, of horizontal lengthwise and transverse girders vertically spaced in the sides thereof having inwardly projecting flanges forming pockets for supporting sections of heat insulating material; metallic reticula secured against the inner and outer surfaces of said insulating material in the top and sides; and tile outside of the outer reticulum in the sides; said frame, girders, insulating material, reticula, and tile being mortared together to form a homogeneous wall structure.

4. In an oven adapted for baking purposes, the combination with a metallic frame of horizontal lengthwise and transverse girders vertically spaced in the sides and horizontal transverse girders, longitudinally spaced in the top and bottom; said girders having flanges forming pockets for supporting heat-insulating bricks; metallic reticula secured against the inner and outer surfaces of said insulating bricks in the top and sides; and tile outside of the outer reticulum in the sides, said frame, girders, insulating bricks, reticula and tile being mortared together to form a homogeneous wall structure.

In witness whereof I hereunto set my signature.

ERNEST E. LINDSEY.